United States Patent [19]

Kanai

[11] Patent Number: 5,790,313

[45] Date of Patent: Aug. 4, 1998

[54] EYEPIECE SYSTEM

[75] Inventor: Moriyasu Kanai, Tokyo, Japan

[73] Assignee: Asahi Kogaku Kogyo Kabushiki Kaisha, Tokyo, Japan

[21] Appl. No.: 585,161

[22] Filed: Jan. 11, 1996

[30] Foreign Application Priority Data

Jan. 10, 1995 [JP] Japan .................. 7-002120

[51] Int. Cl.$^6$ .................. G02B 25/00
[52] U.S. Cl. .................. 359/645; 359/646
[58] Field of Search .................. 359/646, 645, 359/644

[56] References Cited

U.S. PATENT DOCUMENTS

| | | | |
|---|---|---|---|
| 3,202,050 | 8/1965 | Seidenberg | 359/646 |
| 3,519,333 | 7/1970 | Takahashi . | |
| 3,545,844 | 12/1970 | Takahashi et al. . | |
| 3,554,629 | 1/1971 | Takahashi . | |
| 3,795,437 | 3/1974 | Sugiyama . | |
| 3,994,570 | 11/1976 | Sussman | 359/646 |
| 4,017,159 | 4/1977 | Sussman | 359/646 |
| 5,059,004 | 10/1991 | Matsumara | 359/646 |
| 5,155,629 | 10/1992 | Ito et al. . | |
| 5,162,945 | 11/1992 | Matsuo et al. | 359/646 |
| 5,202,795 | 4/1993 | Kashima | 359/645 |
| 5,488,512 | 1/1996 | Muchel | 359/646 |
| 5,557,463 | 9/1996 | Ueno | 359/646 |

FOREIGN PATENT DOCUMENTS 62-255914  12/1995  Japan .

*Primary Examiner*—Georgia Y. Epps
*Assistant Examiner*—Evelyn A. Lester
*Attorney, Agent, or Firm*—Grennblum & Bernstein P.L.C.

[57] ABSTRACT

An eyepiece system includes a single positive lens and a cemented lens assembly having a positive biconvex lens and a negative lens cemented thereto, in this order from the object side. The eyepiece satisfies the relationships defined by $d<0.3f$, and $f_1>1.5f$, wherein "d" represents a distance between the single positive lens and the cemented lens assembly, "f" a focal length of the whole lens system, and "$f_1$" a focal length of the single positive lens.

3 Claims, 7 Drawing Sheets

5,790,313

1
EYEPIECE SYSTEM

BACKGROUND OF THE INVENTION

1. Field of the Invention

The present invention relates to an eyepiece system for a telescope or for binoculars.

2. Description of Related Art

A Kellner eyepiece or inverted Kellner eyepiece having three lenses is known. In general, a Kellner eyepiece is comprised of a positive field lens and a cemented achromatic lens assembly (achromatic doublet), arranged in this order from the object side. The surface of the positive field lens, located nearest to a viewer's eyes, has a radius of curvature smaller than that of the surface located nearest the object. The achromatic lens is spaced from the positive field lens by a large distance.

In a Kellner eyepiece, light incident upon the peripheral portion of the eyepiece (peripheral light) is deflected by the field lens, which has a relatively large positive power, toward the optical axis. Consequently, the light is incident upon the achromatic lens at a low incident (point) height, thus resulting in an eyepiece having short eye relief. This is uncomfortable and inconvenient for the viewer.

In an inverted Kellner eyepiece, in which the achromatic lens is located on the object side and the field lens is located on the viewer's eye side, eye relief is longer than that of the Kellner eyepiece. To reduce the manufacturing cost of the eyepiece, the lenses are preferably plastic. However, since plastic can easily be damaged, a plastic lens cannot be used as the positive lens on the eye side. Moreover, it is difficult to cement plastic lenses.

SUMMARY OF THE INVENTION

The primary object of the present invention is to provide a Kellner-type eyepiece system having a long eye relief.

According to the basic concept of the present invention, the distance between the field lens and the cemented lens is reduced, so that the peripheral light is made incident upon the cemented lens assembly at a high incident point (height). Thus, eye relief can be increased. Moreover, the field lens is preferably an aspherical plastic lens, in order to realize an eyepiece system whose distortion is restricted.

To achieve the object mentioned above, according to the present invention, there is provided an eyepiece system comprising a single positive lens and a cemented lens assembly. The cemented lens has a positive biconvex (double-convex) lens and a negative lens cemented thereto, in this order from the object side. The system satisfies the following relationships:

(1) $d < 0.3f$ (2) $f_1 > 1.5f$ wherein "d" represents the distance between the single positive lens and the cemented lens assembly; "f" represents the focal length of the whole lens system; and, "f" represents the focal length of the single positive lens.

To correct aberrations, and particularly, the pincushion distortion and the curvature of the field of the meridional image surface, in the present invention, preferably, the single positive lens is a plastic material and is provided with at least one aspherical surface which satisfies the following relationship:

$0 r/r_n < 1$

2 wherein "r" represents the radius of paraxial curvature of the aspherical surface; and, "$r_n$" represents the radius of curvature of the aspherical surface in the meridional section at an optional height h ($\neq 0$) from the optical axis.

The eyepiece system preferably satisfies the following relationship:

(4) $(v_+)-(v_-) > 20$ wherein "$v_+$" represents the Abbe number of the positive lens of the cemented lens assembly; and, "$v_-$" reprents the Abbe number of the negative lens of the cemented lens assembly.

According to another aspect of the present invention, there is provided an eyepiece system comprising three lenses: a single plastic lens provided with at least one aspherical surface, and two glass lenses cemented to each other. The single plastic lens is located closer to an object to be viewed than the cemented glass lenses.

With this arrangement, not only can manufacturing cost be reduced, owing to the use of the plastic lens, but also it is possible to prevent the lens located nearest to the viewer's eye(s) from being damaged.

The present disclosure relates to subject matter contained in Japanese Patent Application No. 7-2120 (filed on Jan. 10, 1995) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
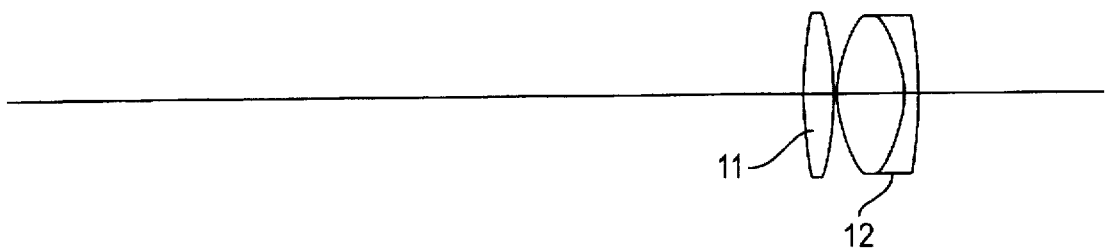
FIG. 1 is a schematic view showing a lens arrangement of an eyepiece system, according to a first embodiment of the present invention.

One of the most significant features of the present eyepiece system resides in the above-mentioned formulae (1) and (2), for a Kellner eyepiece system. The formulae (1) and (2) specify the requirements to increase the eye relief (distance between the surface of the cemented lens assembly located nearest to the viewer's eye(s) and the viewer's eye). If the distance defined in formula (1) is above the upper limit, the height of the incident point of the peripheral light on the cemented lens assembly is so low, as to produce too short of an eye relief. If the focal length $f_1$ of the positive lens (field lens) is below the lower limit defined in formula (2), the power of the positive lens is so large that the peripheral light is considerably deflected toward the optical axis by the field lens. Consequently, the incident point of the peripheral light on the cemented lens assembly is low, also producing short eye relief. If the lens system meets the requirements (1) and (2), eye relief can be increased to approximately 0.85f.

At least one lens surface of the single positive lens is preferably an aspherical surface which is symmetrical (rotation-symmetry) with respect to the optical axis. Thus, the pincushion distortion and the curvature of the field of the meridional image surface can be corrected. Generally speaking, in a conventional Kellner eyepiece system, the curvature of field of the meridional image surface increases in the positive direction (plus direction) as the emission angle of the eyepiece increases. Conventionally, this is corrected by the lens surface of the field lens which has a high convexity. Also, the distortion is restricted by the location of the cemented lens assembly of the positive power adjacent to the viewer's eye(s) as close to the exit pupil as possible (i.e., by shortening the eye relief).

In the present eyepiece system, the curvature of field of the meridional image surface and the distortion are corrected by the single positive lens which is provided with at least one aspherical surface. If the aspherical surface meets the requirement defined by formula 3), the power of the peripheral light in the meridional section is weakened; the curvature of field of the meridional image surface does not become a positive (plus) value; the pincushion distortion is thus corrected. If the aspherical lens is made of a plastic lens, the manufacturing cost is reduced. If the plastic lens is used for the single positive lens, no troublesome cementing operation of the plastic lens elements is necessary. Moreover, if the plastic lens is located on the object side, no damage of the lens occurs.

The formula (4) specifies the Abbe number of the positive and negative lenses of the cemented lens assembly. If the positive and negative lenses are made of materials having Abbe numbers with a difference larger than 20, the lens can be effectively achromatized. If the difference in the Abbe numbers is smaller than 20, chromatic aberration of magnification cannot be effectively compensated.

Seven embodiments of an eyepiece system, according to the present invention will be discussed below. In these embodiments, the eyepiece system is comprised of a single positive lens 11 and a cemented lens assembly 12 having a positive lens and a negative lens, in this order from the object side. The single positive lens 11 is a plastic lens whose one surface is an aspherical surface. The positive and negative lenses of the cemented lens assembly 12 are glass lenses.

In the following tables below, "f" designates the focal length of the whole optical system, "$f_1$" the focal length of the single positive lens, "ER" the eye relief, "d" the distance between the single positive lens and the cemented lens assembly, "R" the radius of curvature of each lens surface, "D" the lens thickness or the distance between the lenses, "Nd" the refractive index of the d-line, and "vd" the Abbe number of the d-line, respectively. In the following drawings, "g-line" and "C-line" designate the chromatic aberrations of magnification at the respective wavelengths, "S" the sagittal rays, and "M" the meridional rays, respectively.

The aspherical surface of rotation symmetry with respect to the optical axis can be generally expressed as follows:

$$X = CY^2/\{1+[1-(1+K)C^2Y^2]^{1/2}\} + A_4Y^4 + A_6Y^6 + A_8Y^8 + A_{10}Y^{10} + \ldots$$

wherein, Y represents a height above the axis,

X represents a distance from a tangent plane of an aspherical vertex,

C represents a curvature of the aspherical vertex(1/r),

K represents a conic constant, $A_4$ represents a fourth-order aspherical factor, $A_6$ represents a sixth-order aspherical factor, $A_8$ represents an eighth-order aspherical factor, $A_{10}$ represents a tenth-order aspherical factor.

Figure 2:
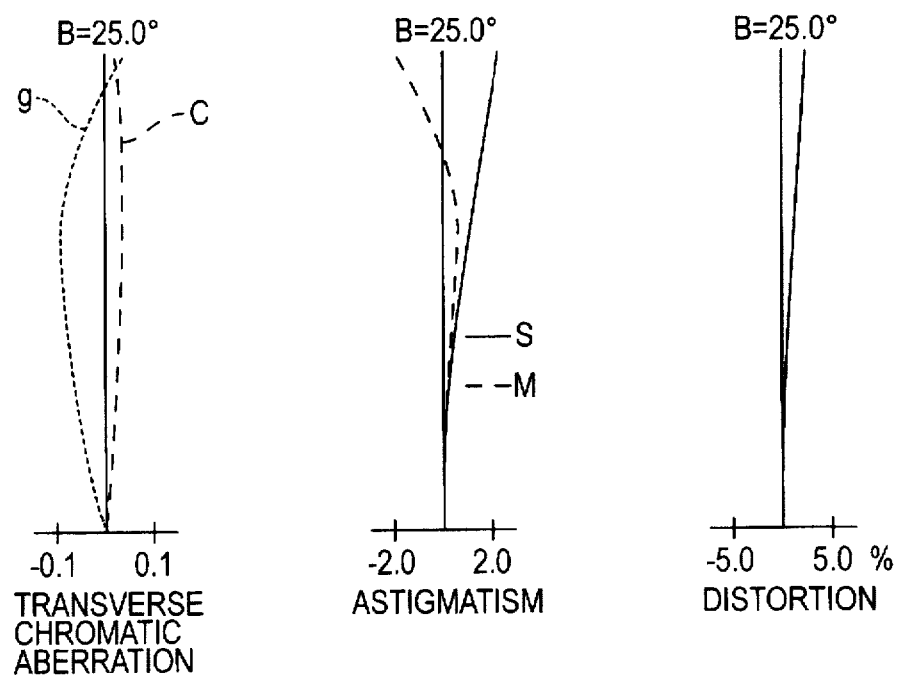
FIG. 2 shows diagrams of aberrations of the lens system shown in FIG. 1.

1st Embodiment:

The lens arrangement of the first embodiment is shown in FIG. 1, and the aberrations of the lens system are shown in FIG. 2. Numerical data of the first embodiment is shown in Table 1 below.

TABLE 1 f = 19.05
$f_1$ = 46.35
d = 0.50
ER = 16

| Surface No. | R | D | Nd | vd |
|---|---|---|---|---|
| 1* | 48.671 | 4.60 | 1.49176 | 57.4 |
| 2 | −41.533 | 0.50 | — | — |
| 3 | 19.000 | 9.44 | 1.60311 | 60.7 |
| 4 | −19.000 | 2.00 | 1.78472 | 25.7 |
| 5 | −69.876 | — | — | — |

*denotes aspherical surface.
aspherical data: No. 1: K = −0.10000 × 10$^2$, A4 = −0.10000 × 10$^{-4}$, A6 = 0.00

Figure 3:
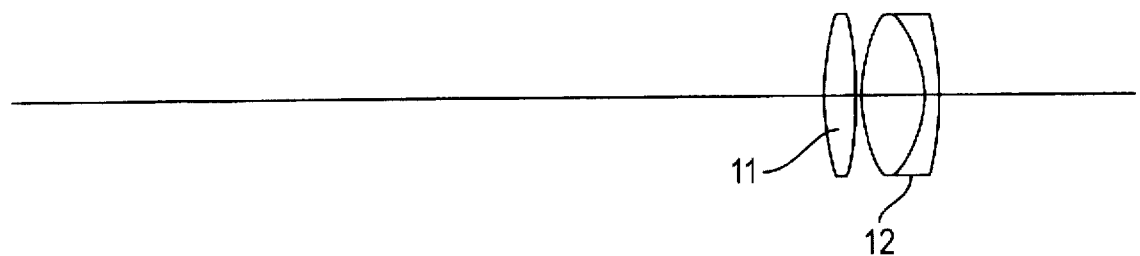
FIG. 3 is a schematic view showing a lens arrangement of an eyepiece system, according to a second embodiment of the present invention.
Figure 4:
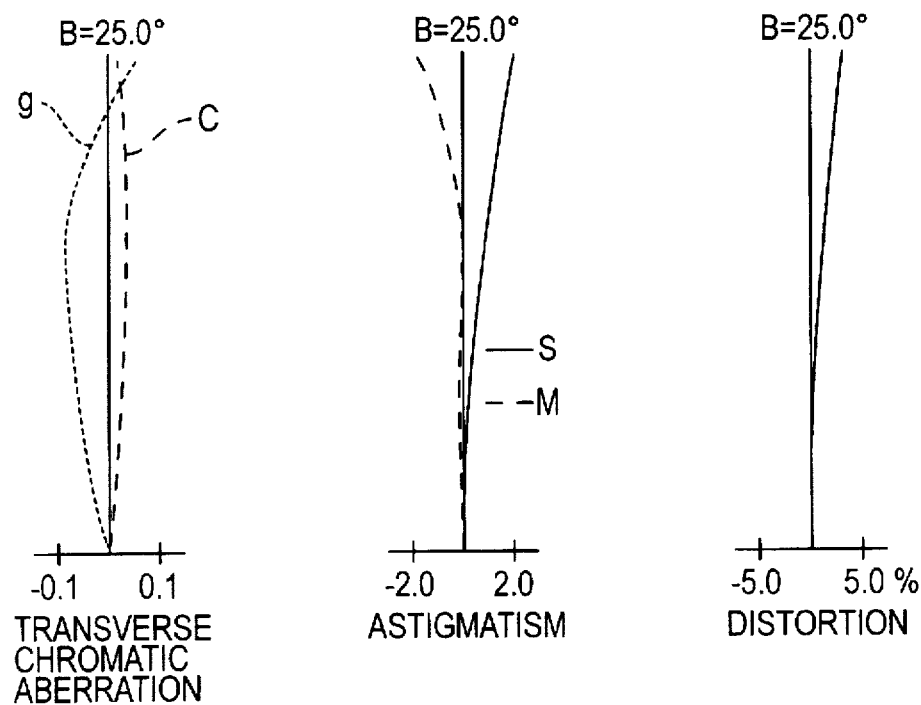
FIG. 4 shows diagrams of aberrations of the lens system shown in FIG. 3.

2nd Embodiment:

The lens arrangement of an eyepiece system according to a second embodiment is shown in FIG. 3, and the aberrations of the optical system shown in FIG. 3 are shown in FIG. 4. Numerical data of the second embodiment is shown in Table 2 below.

TABLE 2 f = 19.00
$f_1$ = 46.65
d = 0.50
ER = 16

| Surface No. | R | D | Nd | vd |
|---|---|---|---|---|
| 1 | 44.756 | 4.60 | 1.49176 | 57.4 |
| 2* | −45.473 | 0.50 | — | — |
| 3 | 20.516 | 8.98 | 1.60311 | 60.7 |
| 4 | −17.115 | 2.00 | 1.78472 | 25.7 |
| 5 | −48.068 | — | — | — |

*denotes aspherical surface.
aspherical data: No. 2: K = 0.00, A4 = 0.21905 × 10$^{-4}$, A6 = −0.33452 × 10$^{-7}$, A8 = 0.00

Figure 5:
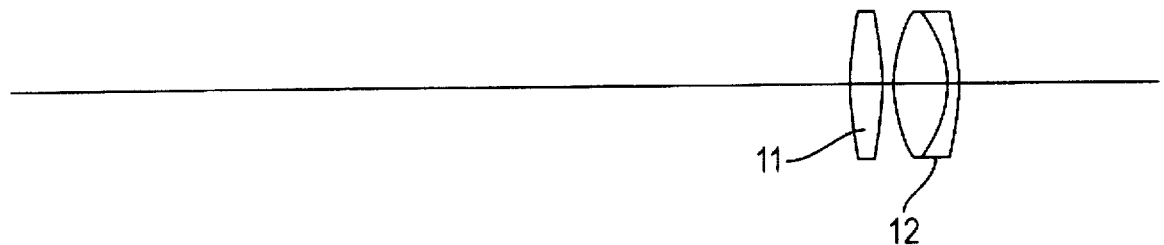
FIG. 5 is a schematic view showing a lens arrangement of an eyepiece system, according to a third embodiment of the present invention.
Figure 6:
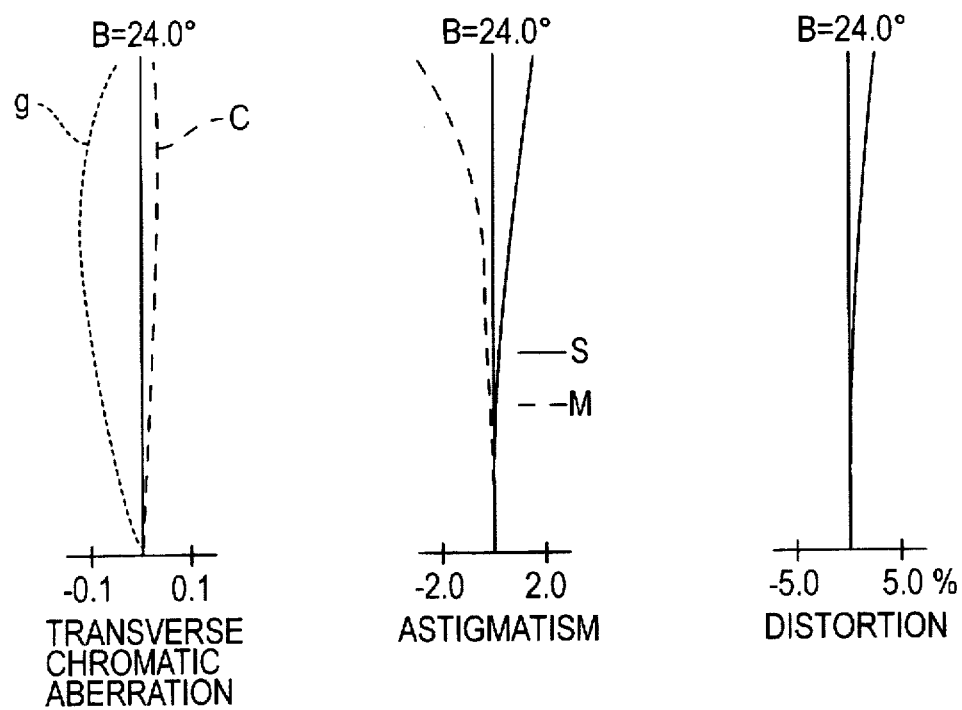
FIG. 6 shows diagrams of aberrations of the lens system shown in FIG. 5.

3rd Embodiment:

The lens arrangement of an eyepiece system according to a third embodiment is shown in FIG. 5, and the aberrations of the optical system shown in FIG. 5 are shown in FIG. 6. Numerical data of the third embodiment is shown in Table 3 below.

TABLE 3 f = 19.00
$f_1$ = 45.65
d = 1.48
ER = 16

| Surface No. | R | D | Nd | vd |
|---|---|---|---|---|
| 1* | 38.342 | 4.42 | 1.49176 | 57.4 |
| 2 | −52.106 | 1.48 | — | — |
| 3 | 21.629 | 7.38 | 1.58913 | 61.2 |
| 4 | −16.222 | 1.67 | 1.74077 | 27.8 |
| 5 | −41.292 | — | — | — |

*denotes aspherical surface.
aspherical data: No. 1: K = −0.16 × $10^2$, A4 = 0.00, A6 = −0.21775 × $10^{-7}$, A8 = 0.00

Figure 7:
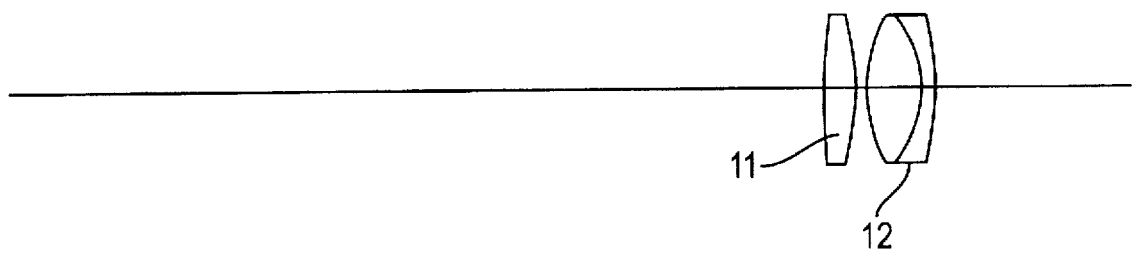
FIG. 7 is a schematic view showing a lens arrangement of an eyepiece system, according to a fourth embodiment of the present invention.
Figure 8:
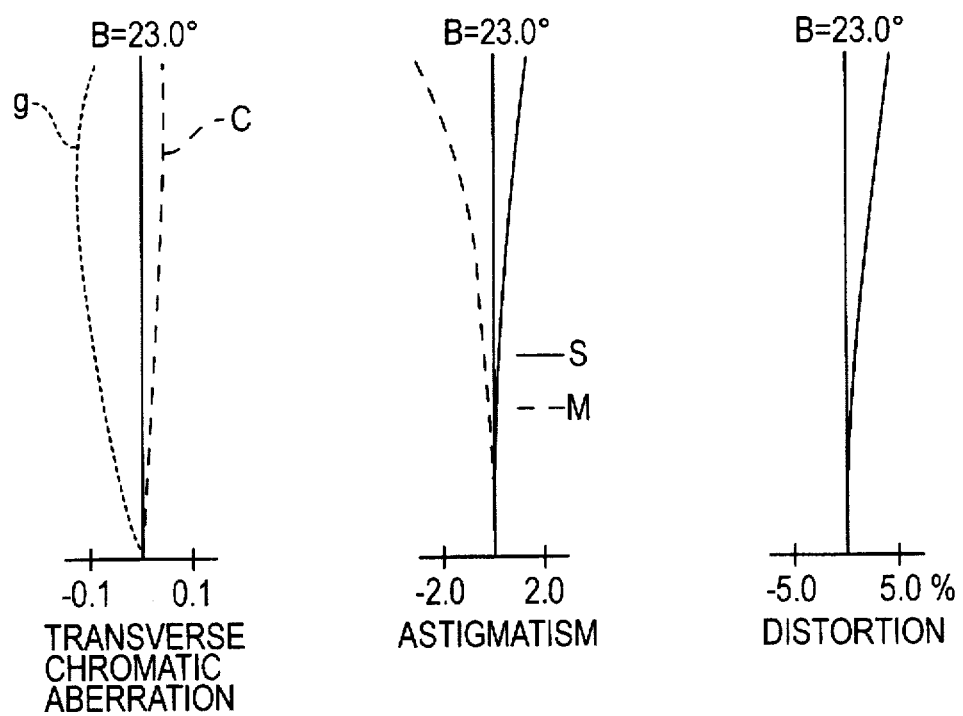
FIG. 8 shows diagrams of aberrations of the lens system shown in FIG. 7.

4th Embodiment:

The lens arrangement of an eyepiece system according to a fourth embodiment is shown in FIG. 7, and the aberrations of the optical system shown in FIG. 7 are shown in FIG. 8. Numerical data of the fourth embodiment is shown in Table 4 below.

TABLE 4 f = 19.00
$f_1$ = 46.10
d = 1.50
ER = 16

| Surface No. | R | D | Nd | vd |
|---|---|---|---|---|
| 1 | 130.559 | 4.62 | 1.49176 | 57.4 |
| 2* | −27.116 | 1.50 | — | — |
| 3 | 22.095 | 7.53 | 1.58913 | 61.2 |
| 4 | −16.571 | 1.70 | 1.74077 | 27.8 |
| 5 | −42.181 | — | — | — |

*denotes aspherical surface.
aspherical data: No. 2: K = −0.23 × 10, A4 = 0.00

Figure 9:
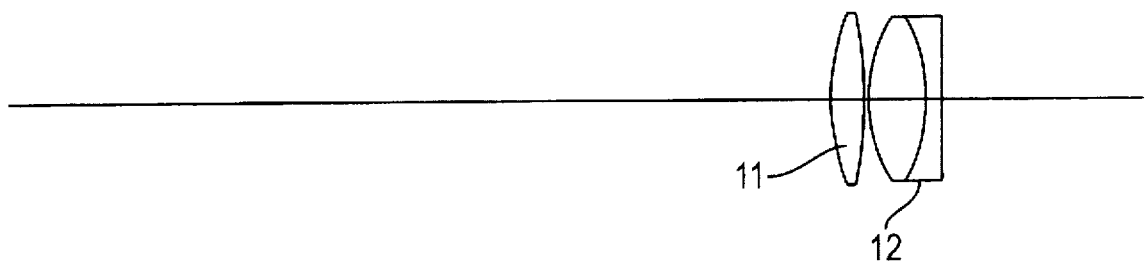
FIG. 9 is a schematic view showing a lens arrangement of an eyepiece system, according to a fifth embodiment of the present invention.
Figure 10:
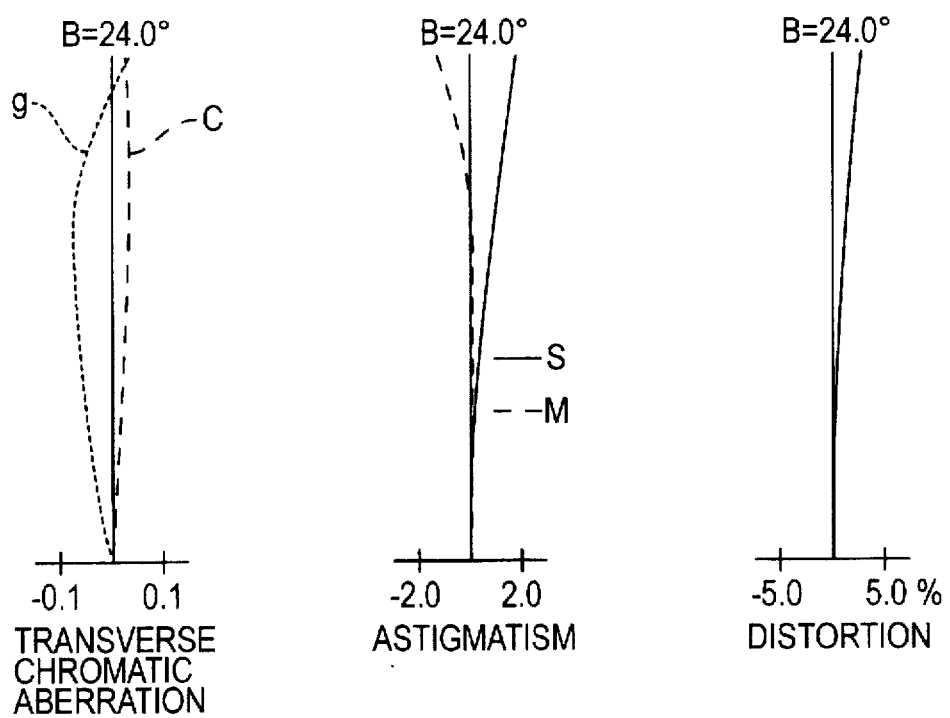
FIG. 10 shows diagrams of aberrations of the lens system shown in FIG. 9.

5th Embodiment:

The lens arrangement of an eyepiece system according to a fifth embodiment is shown in FIG. 9, and the aberrations of the optical system shown in FIG. 9 are shown in FIG. 10. Numerical data of the fifth embodiment is shown in Table 5 below.

TABLE 5 f = 19.01
$f_1$ = 38.53
d = 0.50
ER = 16

| Surface No. | R | D | Nd | vd |
|---|---|---|---|---|
| 1 | 33.597 | 4.60 | 1.49176 | 57.4 |
| 2* | −41.487 | 0.50 | — | — |
| 3 | 21.591 | 7.80 | 1.69680 | 55.5 |
| 4 | −21.591 | 2.00 | 1.78472 | 25.7 |
| 5 | 500.000 | — | — | — |

*denotes aspherical surface.
aspherical data: No. 2: K = 0.00, A4 = 0.15488 × $10^{-4}$, A6 = 0.65653 × $10^{-8}$, A8 = 0.00

Figure 11:
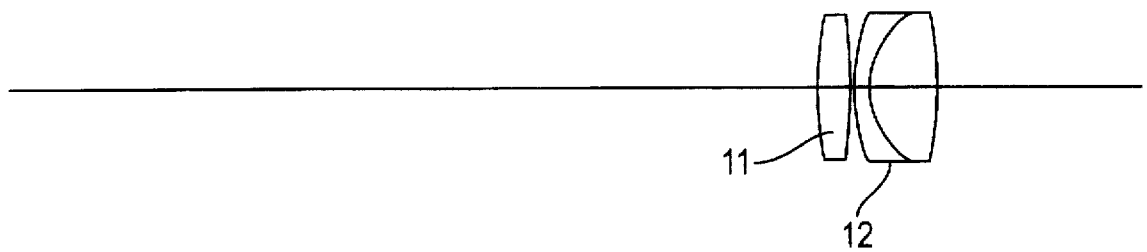
FIG. 11 is a schematic view showing a lens arrangement of an eyepiece system, according to a sixth embodiment of the present invention.
Figure 12:
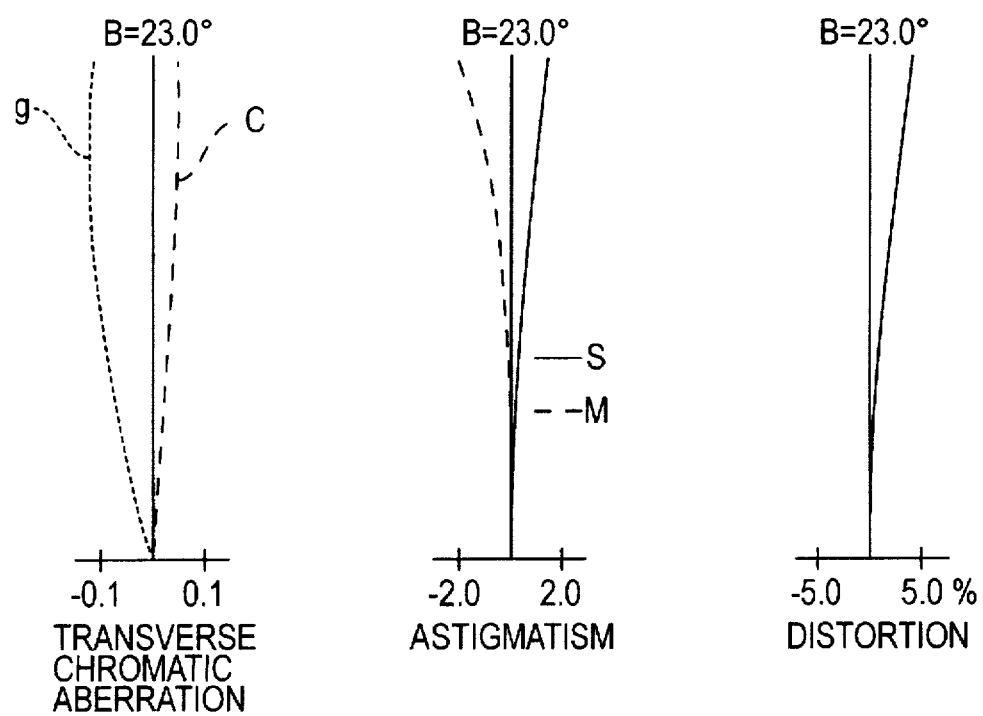
FIG. 12 shows diagrams of aberrations of the lens system shown in FIG. 11.

6th Embodiment:

The lens arrangement of an eyepiece system according to a sixth embodiment is shown in FIG. 11, and the aberrations of the optical system shown in FIG. 11 are shown in FIG. 12. Numerical data of the sixth embodiment is shown in Table 6 below.

TABLE 6 f = 18.99
$f_1$ = 52.52
d = 0.50
ER = 16

| Surface No. | R | D | Nd | vd |
|---|---|---|---|---|
| 1 | 47.852 | 4.60 | 1.49176 | 57.4 |
| 2* | −54.337 | 0.50 | — | — |
| 3 | 29.200 | 2.00 | 1.71736 | 29.5 |
| 4 | 11.372 | 9.50 | 1.71299 | 53.9 |
| 5 | −46.238 | — | — | — |

*denotes aspherical surface.
aspherical data: No. 2: K = 0.00, A4 = 0.23728 × $10^{-4}$, A6 = 0.66330 × $10^{-7}$, A8 = 0.00

Figure 13:
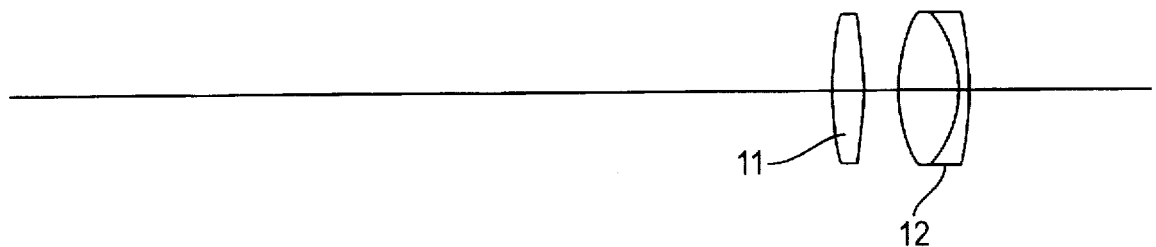
FIG. 13 is a schematic view showing a lens arrangement of an eyepiece system, according to a seventh embodiment of th e present invention; and, FIG. 14 shows diagrams of aberrations of the lens system shown in FIG. 13.
Figure 14:
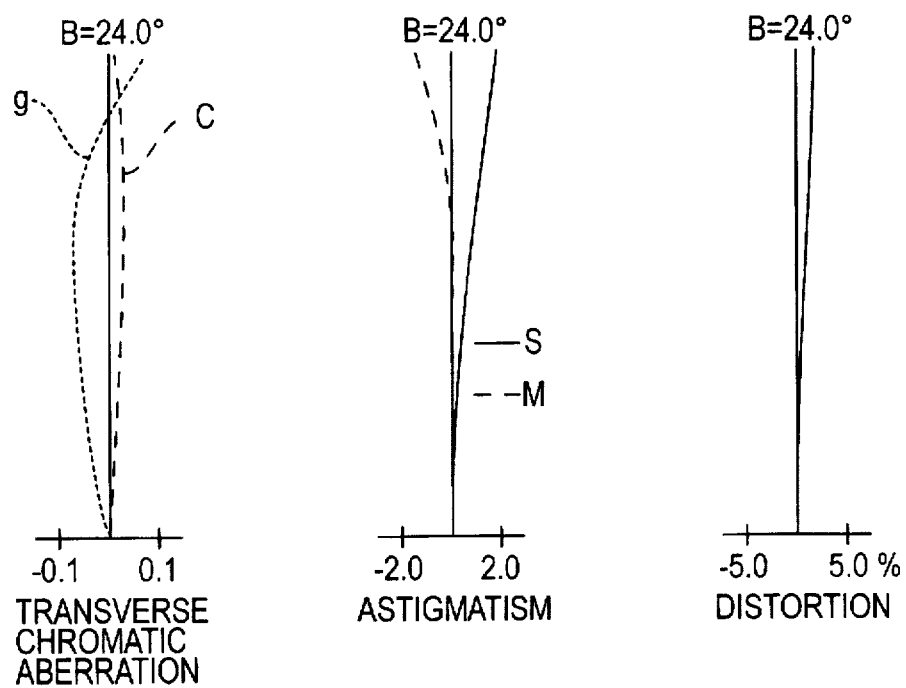

7th Embodiment:

The lens arrangement of an eyepiece system according to a seventh embodiment is shown in FIG. 13, and the aberrations of the optical system shown in FIG. 13 are shown in FIG. 14. Numerical data of the seventh embodiment is shown in Table 7 below.

TABLE 7 f = 19.00
$f_1$ = 47.50
d = 5.00
ER = 16

| Surface No. | R | D | Nd | vd |
|---|---|---|---|---|
| 1 | 46.244 | 4.60 | 1.49176 | 57.4 |
| 2* | −45.669 | 5.00 | — | — |
| 3 | 23.035 | 8.63 | 1.69680 | 55.5 |
| 4 | −15.941 | 1.50 | 1.78472 | 25.7 |
| 5 | −51.449 | — | — | — |

*denotes aspherical surface.
aspherical data: No. 2: K = 0.00, A4 = 0.30289 × $10^{-4}$, A6 = 0.46986 × $10^{-7}$, A8 = 0.00

Numerical values of the formulae (1), (2) and (4) corresponding to the seven embodiments (1st–7th embodiments) are shown in Table 8 below.

TABLE 8

| | d | $f_1$ | $v_+$-$v_-$ |
|---|---|---|---|
| Embodiment 1 | 0.03f | 2.43f | 35.0 |
| Embodiment 2 | 0.03f | 2.46f | 35.0 |
| Embodiment 3 | 0.08f | 2.40f | 33.4 |
| Embodiment 4 | 0.08f | 2.43f | 33.4 |
| Embodiment 5 | 0.03f | 2.03f | 29.8 |
| Embodiment 6 | 0.03f | 2.77f | 24.4 |
| Embodiment 7 | 0.26f | 2.50f | 29.8 |

As can be seen from Table 8, the first to fifth embodiments meet the requirements defined in the formulae (1), (2) and (4). Moreover, the eye relief is long, 16 mm, and the aberrations are relatively effectively compensated for in the these embodiments.

Table 9 below shows numerical values of formula 3) when h is 3 mm and h is 6 mm, respectively.

TABLE 9

| | when h = 3 | when h = 6 |
|---|---|---|
| Embodiment 1 | 0.894 | 0.604 |
| Embodiment 2 | 0.897 | 0.643 |
| Embodiment 3 | 0.867 | 0.578 |

TABLE 9-continued

|  | when h = 3 | when h = 6 |
| --- | --- | --- |
| Embodiment 4 | 0.959 | 0.852 |
| Embodiment 5 | 0.931 | 0.725 |
| Embodiment 6 | 0.853 | 0.318 |
| Embodiment 7 | 0.847 | 0.340 |

It can be seen from Table 9 that all the embodiments satisfy the requirement defined by formula 3).

As may be understood from the above discussion, according to the present invention, an eyepiece system having a long eye relief can be obtained.

What is claimed is:

1. An eyepiece system comprising:

a lens group consisting of a single positive lens;

a cemented lens assembly having a positive biconvex lens and a negative lens cemented thereto, said lens group and said cemented lens assembly being arranged in this order from an object side; and said eyepiece system satisfying the following relationships:

$$d<0.3f$$

$$f_1>1.5f; \text{ and}$$

said single positive lens is provided with at least one aspherical surface which satisfies the following relationship:

$$0<r/r_h<1$$

wherein

"d" represents a distance between said single positive lens and said cemented lens assembly;

"f" represents a focal length of the whole lens system;

"$f_1$" represents a focal length of said single positive lens;

"r" represents a radius of paraxial curvature of said aspherical surface; and

"$r_h$" represents a radius of curvature of said aspherical surface in a meridional section at an optional height from the optical axis, said optional height not being equal to zero.

2. The eyepiece system according to claim 1, wherein the eyepiece system satisfies the following relationship:

$$(v_+)-(v_-)>20$$

wherein

"$v_+$" represents an Abbe number of said positive lens of said cemented lens assembly; and "$v_-$" represents an Abbe number of said negative lens of said cemented lens assembly.

3. An eyepiece system consisting of three lenses consisting of a single plastic lens which is provided with at least one aspherical surface and two glass lenses cemented to each other, said single plastic lens being located closer to an object to be viewed than the cemented glass lenses.

* * * * *